Figure 1:
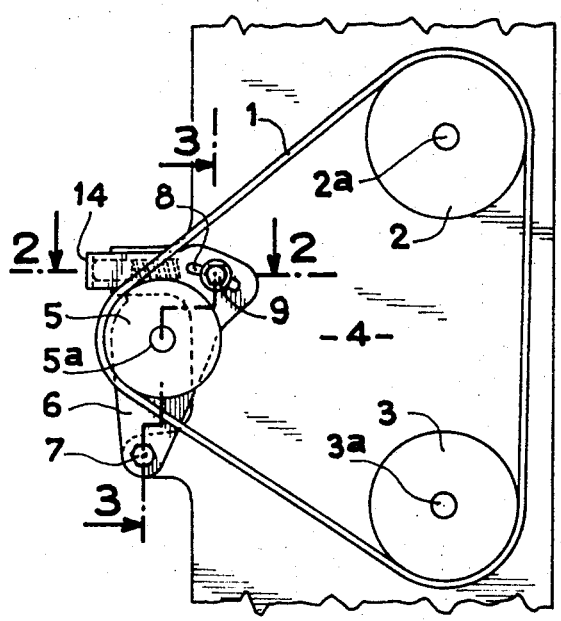

United States Patent [19]
Castarede

[11] 3,811,333
[45] May 21, 1974

[54] DRIVE BELT TENSIONING DEVICE

[75] Inventor: Armand Castarede, Meudon-la-Foret, France

[73] Assignees: Regie National Des Usines Renault, Boulogne-Billancourt; Automobiles Peugeot, Paris, both of, France

[22] Filed: Apr. 12, 1973

[21] Appl. No.: 350,652

[30] Foreign Application Priority Data
May 4, 1972 France .............................. 72.15836

[52] U.S. Cl. .......................................... 74/242.15 R
[51] Int. Cl. ............................................... F16h 7/10
[58] Field of Search ............... 74/242.15 R, 242.1 R

[56] References Cited
UNITED STATES PATENTS
3,464,282  9/1969  Grobowski ............... 74/242.15 R X
3,631,734  1/1972  Wagner ..................... 74/242.15 R X Primary Examiner—Leonard H. Gerin
Attorney, Agent, or Firm—Burns, Doane, Swecker & Mathis

[57] ABSTRACT

Comprises a sheet metal support pivotably mounted on a first face of a structure which defines a right-angled corner with a second face of the structure. A tab portion, bent at an angle to the plane of the support, extends around the corner and engages an abutment movably mounted in a blind aperture in said second face. A spring interposed between the abutment and the end of the aperture biases the abutment and the support for tensioning the belt. Fixing means fix the support in the required position.

4 Claims, 3 Drawing Figures

PATENTED MAY 21 1974　　　　　　　　　　　　　　　　3,811,333

DRIVE BELT TENSIONING DEVICE

The present invention relates to a belt tensioning device of the type described in the French Pat. No. 1,581,626 and adapted in particular to tension a belt which drives accessory or distributor parts of an internal combustion engine.

Such a device comprises a tightening element, such as a pulley, around which the belt passes and which is carried by a support which can be adjusted and fixed in position relative to a fixed structure. This support moreover bears through a movable abutment on a resiliently yieldable element the rating of which is such as to determine the suitable tension of the belt. With such a device, it is sufficient to release the attachment of the support to the structure so that the resiliently yieldable means can determine if the tension of the belt is correct. The support is locked in the position to which the yieldable means bias it so as to obtain the desired belt a tension.

The embodiment described in the above French Patent regulates this tension with high precision and high fidelity since it comprises reference and rating means whereby the spring may be returned to its ideal position.

However, such precision is not absolutely essential and the means required for obtaining it greatly complicate the device and render it relatively expensive.

An object of the present invention is to provide a modification which is simpler and easier to carry out and cheaper.

This result is obtained by providing in the fixed structure, for example the cylinder block of an engine, a blind aperture receiving the resiliently yieldable means and the movable abutment against which the adjustable support bears.

This support comprises an abutment surface which is in direct contact with the movable abutment so that the number of parts constituting the device is considerably reduced.

Further, the spring is so designed as to have a substantially constant stiffness over a range of deformations corresponding to the expected tensioning requirements.

Figure 3:
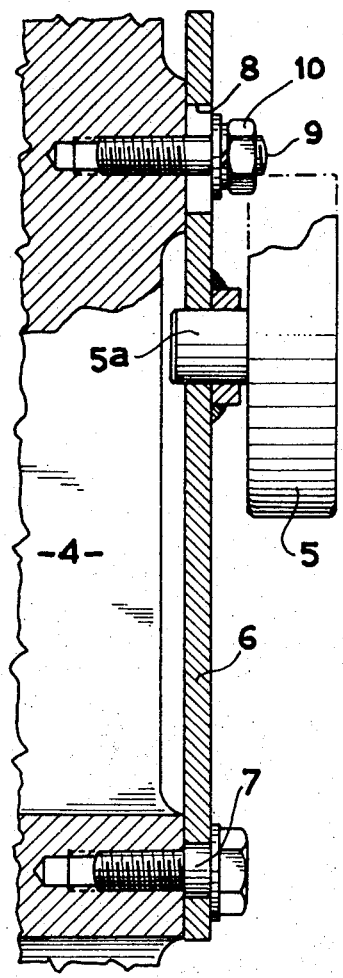
Figure 2:
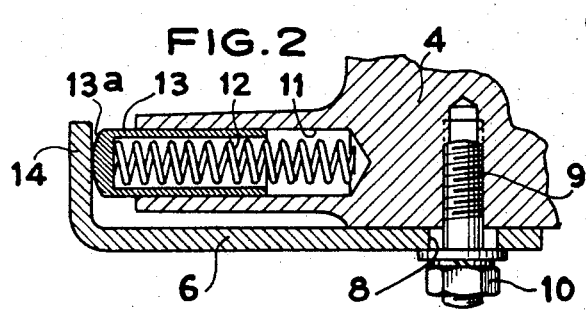

A more detailed description will now be given with reference to the accompanying drawing which is given merely by way of example and in which:

FIG. 1 is an elevational view of a belt tensioning device according to the invention, and FIGS. 2 and 3 are sectional views taken on lines 2—2 and 3—3 of FIG. 1.

FIG. 1 shows an endless belt 1 which passes around two pulleys 2, 3, the spindles 2a, 3a of which are fixed in position with respect to a structure 4, which may be a cylinder block of an internal combustion engine. This belt also passes around a tensioning pulley 5 mounted on a spindle 5a carried by a support 6. The latter is mounted on the structure in such manner as to be pivotable about a pin 7 within limits defined by an arcuate aperture 8 centered on the pin 7 and by a screwthreaded stud 9 carried by the structure. A nut 10 locks the support 6 in the selected position.

According to the invention, the structure 4 comprises a blind aperture 11 whose axis is orthogonal to the axis 7 and in which are received a spring 12 and a movable abutment 13. The support 6 includes a tab 14 which bears against the end surface 13a of said abutment, which end surface has the shape of a spherical dome so as to maintain correct conditions of contact in all positions of the support 6 and tab 14.

This device operates in a very simple manner:

With the belt in position on the pulleys 2, 3 and 5 and the nut 10 loosened, the spring 12 exerts on the tab 14, the support 6 and the belt a given tensioning force. Corresponding to this force is a position of the support 6 which may then be locked in this position. After a period of utilisation it is sufficient to once more loosen the nut 10 so as to verify by the effect of the spring 12 if the belt has stretched or not and modify the adjustment if required.

In practice, this arrangement permits performing a function comparable to that of the device described in the above French Patent but with much simpler means. A single support part is employed constituted by a very cheap press-formed sheet metal member. The intermediate abutment 13 may be obtained by extrusion and be composed of a light metal or alloy or other suitable material. When the structure 4 is the cylinder block of an engine, the aperture 11 may be drilled in the course of the normal machining of the cylinder block without affecting the machining cycle so that it costs practically nothing to drill.

It will also be observed that the support 6 is fixed to the structure at two points 7 and 9 which are remote from each other and located on each side of the spindle 5a which renders the assembly well rigid. Further, the large leverage between the pin 7 and the point of application of the force by the spring permits employing a relatively weak spring whose stiffness remains practically constant within the employed operational range.

Having now described my invention what I claim as new and desire to secure by Letters Patent is:

1. In a belt tensioning device comprising a fixed structure having a first face, a support movably mounted on the first face of the structure, a belt tensioning element for engaging the belt and carried by the support, an abutment movable relative to the structure and engaging the support and resiliently yieldable means interposed between the abutment and the structure for biasing the abutment and the support for tensioning the belt; the following features: the structure comprises a second face substantially perpendicular to said first face and forming a corner with said first face and a blind aperture in said second face in which aperture said resiliently yieldable means and said abutment are engaged, and the support has a thrust portion which extends around said corner and engages the abutment.

2. A device as claimed in claim 1, wherein the support comprises a member of sheet metal having a first portion extending in a plane and a tab portion extending from the first portion at an angle to said plane and constituting said thrust portion, the support being pivotably mounted on the structure by a pivot pin extending through the first portion, and means being provided for fixing the first portion of the support in position relative to the structure in a region of the first portion remote from the pivot pin.

3. A device as claimed in claim 1, wherein the abutment has a curved convex shaped end portion which engages the thrust portion of the support.

4. A device as claimed in claim 3, wherein the end portion of the abutment has a spherical dome shape.

* * * * *